Sept. 14, 1948.   P. A. W. M. SLEEGERS   2,449,420
ELECTRODE SYSTEM
Filed Sept. 20, 1945
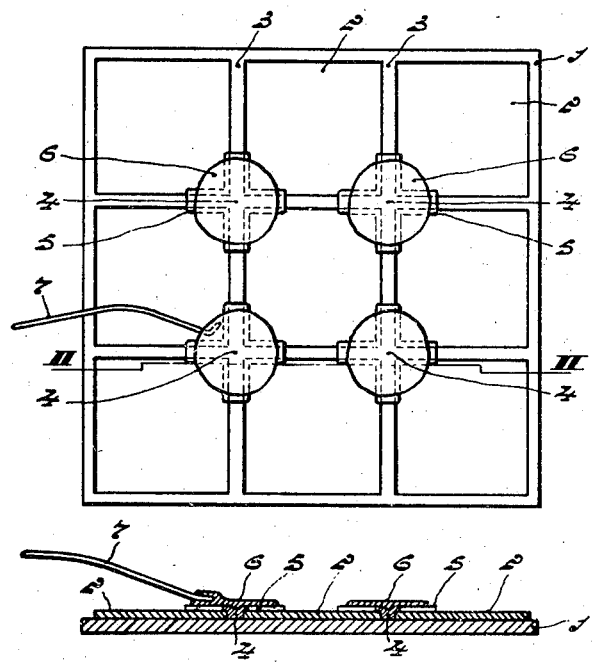
INVENTOR
PAULUS ANTONIUS WILHELMUS MARIA SLEEGERS
BY
ATTORNEY Patented Sept. 14, 1948

2,449,420

UNITED STATES PATENT OFFICE 2,449,420

ELECTRODE SYSTEM

Paulus Antonius Wilhelmus Maria Sleegers, Eindhoven, Netherlands, assignor to Hartford National Bank & Trust Co., Hartford, Conn., as trustee Application September 20, 1945, Serial No. 617,579
In the Netherlands March 28, 1942

Section 1, Public Law 690, August 8, 1946
Patent expires March 28, 1962

8 Claims. (Cl. 175—366)

This invention relates to a blocking-layer electrode system, more particularly a rectifier, in which at least one of the electrodes is interrupted in such manner as to create a certain number of individual cells, all of the electrode portions created by the interruption bearing on a blocking layer by which these parts are insulated from each other.

It has already been proposed to divide a blocking-layer electrode system provided on a support into several cells. Such a system is described in Patent No. 2,338,907 issued January 11, 1944 to C. De Lange et al. in which a semi-conducting electrode with a blocking layer bearing thereon is provided on a support and a certain number of layers, which are separated from each other and consist of a conducting alloy, are applied thereto by spraying. These alloy layers together with their common semi-conducting electrode constitute separate cells, each of which is provided with a supply conductor for connection to the outside. The advantage of such a structure appears where a short circuit occurs for some reason between the electrodes at a single point of a plate during manufacture. If the system is divided into a certain number of cells in the manner referred to above only that cell need remain inoperative in which occurs the short circuit so that the other cells can be used for rectification. In this case the damaged cell is not connected to the assembly, in other words the electrode of the cell in question is not connected to the corresponding electrode of the other cells.

In the above-mentioned patent a structure has been disclosed in which the supply conductors are shaped as a wire or strip which is interchangeable.

The present invention has for its object to provide a simplification in regard to this structure. For the construction according to the invention I proceed in such manner that in the case of short circuits occurring during manufacture the cells in which this takes place do not partake in rectification. However, the cells are not disconnected individually if a short circuit occurs in one of the cells during further operation. In fact, it is often sufficient to satisfy the first-mentioned condition.

The invention exhibits the feature that the parts of the interrupted electrode are interconnected through members of conducting material which bear on an additional layer of insulating material which is provided on the outer layer of the blocking-layer system at the junction.

The advantage of the construction according to the invention primarily consists in that a minimum of space is required for the connecting members. In fact, the latter do not project from the rectifying plate, since they bear directly on the blocking layer. Consequently, such a plate has a very small thickness.

If the rectifying cells are electrically formed separately after manufacture, whereby the properties of the blocking layer are improved, the fact occurs that solely these points of the blocking layer where the counterelectrode bears acquire better properties. The uncovered parts of the blocking layer conserve their initial properties. When providing connecting members at these points of the blocking layer these members locally constitute small rectifiers whose blocking properties are inferior to those of the cells already formed so that at these points the risk of a breakdown is greater. However, this drawback is obviated by the invention, since the connecting member is separated from the blocking layer by means of an insulating additional layer.

The insulating layer, which bears in its turn on the blocking layer, imparts such a support to the connecting member that the latter themselves need not have a sufficient mechanical rigidity to support themselves. Consequently care has only to be taken that the section of the members is such that the current passes through them without excessive losses and production of heat.

In a suitable form of construction of the invention the connecting members may be made by spraying an alloy having a low melting point. In this way the members are provided in a very simple manner without the intervention of special means, particularly if the electrodes of the individual cells have also been obtained by spraying an alloy having a low melting point.

For the connecting members the same material is advantageously chosen as that of which consist the electrodes connected by means of these members. This yields more particularly an excellent adherence between the electrode parts and members. Furthermore, the use of an alloy having a low melting point for the connecting members has the advantage that it does not affect the properties of the semi-conductive layer and the blocking layer, since the temperature, at which I proceed, may be kept low.

In regard to the insulating layer supporting the connecting members it is advantageous to make use of layers of lacquer, since they can generally be applied to the blocking layer at a low temperature. Moreover, these materials, especially synthetic resins, generally have excellent insulating properties. In addition it is advantageous to use such materials, since in the case of being dissolved in an organic solvent, they can be applied at room temperature, and the solvent, which generally has a high vapour pressure even at room temperature, can be easily removed.

Under certain conditions it may also be advantageous to make use of a conducting lacquer for the connecting members. The conducting constituents of such a material have such a small resistance as to permit a considerable current density. Connecting members consisting of such a material can be applied at a slightly increased temperature.

Again, it may be advantageous to make the connecting members from a material which together with the material of the electrode, from which the member is insulated, forms an insulating chemical compound without the passage of current. In this case the provision of a separate insulating layer is superfluous.

More particularly, when making use of selenium to constitute the semi-conductive electrode it is advantageous to use zinc as a material for the connecting members. This material combines with the selenium which contacts therewith, through the blocking layer, particularly in the case of the zinc being applied by spraying so that it is forced through the blocking layer, to form an insulating zinc-selenium compound.

The following executional example will be explained by reference to the drawing in which Fig. 1 is a plan view and Fig. 2 a section on the line II—II. The aluminium plate 1 carries throughout its surface a selenium semi-conductor which is covered in a well-known manner with a genetic blocking layer. Since both of these layers are extremely thin they are not represented in the drawing. After these layers have been applied nine layers 2 of an alloy melting at 103° C. and consisting of tin, bismuth and cadmium are applied by spraying with the aid of templets. After spraying the templets are removed and the layers serve as electrodes. These layers whose thickness is exaggerated in the drawing are consequently separated from each other by the blocking-layer strips 3 which are not covered with a layer consisting of an alloy. Thus nine individual cells are formed all of which have a common semi-conductive electrode.

After that the cell thus manufactured is formed, for instance according to the method described in Patent No. 2,327,511, issued Aug. 24, 1943, to C. De Lange et al. The blocking layers below the layers 2 are reinforced thereby so that the countervoltage of the cells is raised. If a conductive material were applied directly to these strips a rectifier having unsatisfactory blocking properties would be created at the junction 4 of the strips 3 of the blocking layer, since the blocking layer strips 3 are not acted upon by the said treatment, which gives rise to a breakdown. In order to avoid this risk cruciform layers 5 of insulating material, for instance of polystyrene, are provided at the junctions of the strips of the blocking layer 4, which layers may, for instance, have a thickness of 10 to 100 microns. On these crosses is sprayed a contact piece 6 consisting of the above-mentioned alloy. This piece may be circular or square. Consequently such a layer of alloy establishes the mutual contact between four adjoining electrodes 4. To permit the assembly to be connected to the outside a supply conductor 7 is provided by soldering on one of the connecting members. Since the thickness of the members exceeds that of the electrode parts a soldered joint can be readily provided at this point. In this case interconnection of the nine cells is effected by means of four contact members. If it is found in measuring after manufacture that one of the cells exhibits a short circuit or another property on account of which the cell should not partake in rectification, the connecting members for the cell in question are omitted.

Instead of using a cruciform insulating layer it is also possible to provide a circular insulating layer at the four joining angular points of adjoining cells followed by applying a square conductive layer thereto.

In cases where less stringent conditions are imposed the additional insulation can be obtained at the connections when making use of a material to constitute the connection which together with the electrode located below the blocking layer establishes an insulating compound. If the last-mentioned electrode consists of selenium zinc may be used for the connection. As far as the blocking layer is not completely tight at this point the zinc contacts with the selenium, as a result of which an insulating selenium-zinc compound is formed as additional insulation.

What I claim is:

1. A blocking layer electrode system comprising a supporting base, a common electrode carried on said base, a blocking layer formed on said common electrode, a plurality of electrodes on said blocking layer and insulated each from one another by strips of said blocking layer, electrically conductive members interconnecting said electrodes, and a supporting layer of insulating material interposed between each of said conductive members and said blocking layer strips which insulate said electrodes one from the other.

2. A blocking layer electrode system comprising a supporting base, a common electrode carried on said base, a blocking layer formed on said common electrode, a plurality of electrodes on said blocking layer and insulated each from one another by strips of said blocking layer, a plurality of thin layers of electrically conductive material interconnecting said electrodes, and a supporting layer of insulating material interposed between each of said conductive layers and said blocking layer strips which insulate said electrodes one from the other.

3. A blocking layer electrode system comprising a supporting base, a common electrode carried on said base, a blocking layer formed on said common electrode, a plurality of electrodes on said blocking layer and insulated each from one another by strips of said blocking layer, electrically conductive members consisting of a low melting-point alloy interconnecting said electrodes, and a supporting layer consisting of an insulating material interposed between each of said conductive members and said blocking layer strips which insulate said electrodes one from the other.

4. A blocking layer electrode system comprising a supporting base, a common electrode carried on said base, a blocking layer formed on said common electrode, a plurality of electrodes on said blocking layer and insulated each from one another by strips of said blocking layer, electrically conductive members consisting of the material of said electrodes interconnecting said electrodes, and a supporting layer of insulating material interposed between each of said conductive layers and said blocking layer strips which insulate said electrodes one from the other, 5. A blocking layer electrode system comprising a supporting base, a common electrode carried on said base, a blocking layer formed on said common electrode, a plurality of electrodes on said blocking layer and insulated each from one another by strips of said blocking layer, electrically conductive members interconnecting said electrodes, and a supporting layer of insulating lacquer consisting of a synthetic resin interposed between each of said conductive members and said blocking layer strips which insulate said electrodes one from the other.

6. A blocking layer electrode system comprising a supporting base, a common electrode carried on said base, a blocking layer formed on said common electrode, a plurality of electrodes on said blocking layer and insulated each from one another by strips of said blocking layer, layers of electrically conducting lacquer interconnecting said electrodes, and a supporting layer of insulating material interposed between each of said conducting layers and said blocking layer strips which insulate said electrodes one from the other.

7. A blocking layer electrode system comprising a supporting base, a common electrode carried on said base, a blocking layer formed on said common electrode, a plurality of electrodes on said blocking layer and insulated each from one another by strips of said blocking layer, electrically conductive members interconnecting said electrodes, and a supporting layer of insulating material interposed between said conductive members and said blocking layer strips which insulate said electrodes one from the other, said insulating material consisting of a chemical compound of the material of said conductive member and the material of said common electrode.

8. A blocking layer electrode system comprising a supporting base, a common selenium electrode carried on said base, a blocking layer formed on said selenium electrode, a plurality of electrodes on said blocking layer and insulated from each other by strips of said blocking layer, zinc members interconnecting said electrodes, and an insulating layer consisting of a chemical compound of zinc and selenium interposed between each of said zinc members and said blocking layer strips which insulate said electrodes one from the other.

PAULUS ANTONIUS WILHELMUS
MARIA SLEEGERS.

REFERENCES CITED

The following references are of record in the file of this patent:

UNITED STATES PATENTS

| Number | Name | Date |
| --- | --- | --- |
| 2,226,716 | Geisler | Dec. 31, 1940 |
| 2,314,104 | Richards | Mar. 16, 1943 |
| 2,327,511 | De Lange et al. | Aug. 24, 1943 |
| 2,330,594 | Kipphan | Sept. 28, 1943 |